UNITED STATES PATENT OFFICE.

EDUARD HEPP, OF OFFENBACH-ON-THE-MAIN, GERMANY, ASSIGNOR TO THE FIRM OF K. OEHLER, OF SAME PLACE.

MANUFACTURE OF BLUE DYE-STUFF OR COLORING-MATTER.

SPECIFICATION forming part of Letters Patent No. 270,311, dated January 9, 1883.

Application filed July 1, 1882. (Specimens.)

*To all whom it may concern:*

Be it known that I, EDUARD HEPP, of Offenbach-on-the-Main, Germany, have invented new and useful Improvements in Coloring-Matter, of which the following is a specification.

The object of my invention is the production of a blue dye-stuff or coloring-matter by the treatment of the nitroso derivatives of tertiary aromatic monamines, especially of the nitroso-dimethylaniline in a solution of concentrated sulphuric acid with sulphureted hydrogen, or a metallic sulphide which can be decomposed by acids. For instance, one (1) part of nitroso-dimethylaniline is dissolved in thirty (30) parts of sulphuric acid of 1.4 specific gravity, and sulphide of zinc is slowly poured into the solution. It is advantageous to keep the temperature of the mixture under 20° centigrade, (68° Fahrenheit.) The solution turns first a greenish color, then blue, and finally, when there is enough sulphide of zinc added, it becomes colorless. Usually five (5) parts of the sulphide of zinc for one (1) part nitroso-dimethylaniline are sufficient to produce this reaction. The solution is then diluted with water, filtered, and the decolorized liquid is oxidized with chloride of iron. The blue coloring-matter thus obtained is precipitated by the addition of common salt and a solution of chloride of zinc, and is separated by successive treatments with water.

I do not limit myself to the above-named proportions, bodies, and method of working, which can all be changed within wide limits. For instance, when the solution of nitroso-dimethylaniline in concentrated sulphuric acid is treated with sulphureted hydrogen or other metallic sulphides than sulphide of zinc it is advantageous to let the reaction take place only so long as the liquid appears of a green color, and then to treat with reducing agents—such as zinc-dust or iron—to obtain the decolorized solution. The reaction is continued in the above-described manner.

Instead of sulphureted hydrogen and metallic sulphides, I can use also the salts or the ethers of the thiocyamic or thiocarbonic acid, or other derivatives of the thiocyamic acid—such as thiocarbonides.

The essential principle of my method is the treatment of nitroso-dimethylaniline in a solution of concentrated sulphuric acid. All other tertiary aromatic monamines which have corresponding nitroso derivatives can be employed. For instance, from the diethyl and the ethyl-methylaniline treated in the above-described manner blue dye-stuffs can be obtained; but they do not offer any advantage in comparison with that obtained from dimethyl-aniline.

My new dye-stuff is a blue-black powder with a pronounced bronze sheen. It is easily soluble in water, and is not affected by diluted acids or alkalies. Reducing agents—such as zinc-dust—decolorize this dye-stuff; but the reduced solution gets blue again when brought in contact with air or oxidizing agents. Chlorine alters this color. It makes it first reddish-brown, and silver-gray after a stronger reaction. Steam has a destroying influence upon the ethyline blue, and it therefore requires special care in printing. This blue coloring-matter is employed in a similar manner to methyl-violet, benzol-green, and methyline-blue for dyeing and printing purposes on cotton, wool, and silk. On cotton it is pretty fast against light and soap.

What I claim as my invention, and desire to secure by Letters Patent, is—

1. The within-described method of producing coloring-matters formed from the nitroso derivatives of tertiary aromatic monamines by dissolving the latter in sulphuric acid and subjecting the solution to the action of reducing agents, substantially as set forth.

2. The coloring-matter produced by the reaction of nitroso-dimethylaniline dissolved in concentrated sulphuric acid and then subjected to the action of a reducing agent, substantially as set forth.

In testimony whereof I have signed my name to this specification in the presence of two subscribing witnesses.

EDUARD HEPP.

Witnesses:
FRANZ FLASSLACHER,
FRIEDRICH JAEGER.